United States Patent
Li et al.

(10) Patent No.: US 9,454,958 B2
(45) Date of Patent: Sep. 27, 2016

(54) EXPLOITING HETEROGENEOUS DATA IN DEEP NEURAL NETWORK-BASED SPEECH RECOGNITION SYSTEMS

(71) Applicant: Microsoft Corporation, Redmond, WA (US)

(72) Inventors: Jinyu Li, Redmond, WA (US); Dong Yu, Bothell, WA (US); Yifan Gong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 402 days.

(21) Appl. No.: 13/787,821

(22) Filed: Mar. 7, 2013

(65) Prior Publication Data

US 2014/0257804 A1    Sep. 11, 2014

(51) Int. Cl.
| | | |
|---|---|---|
| G10L 15/16 | (2006.01) | |
| G10L 15/02 | (2006.01) | |
| G06N 3/02 | (2006.01) | |

(52) U.S. Cl.
CPC ............. *G10L 15/16* (2013.01); *G10L 15/02* (2013.01); *G06N 3/02* (2013.01)

(58) Field of Classification Search
USPC ........................................................ 704/232
See application file for complete search history.

(56) References Cited

U.S. PATENT DOCUMENTS

| | | | |
|---|---|---|---|
| 8,126,710 B2 | 2/2012 | Gemello et al. | |
| 8,311,813 B2 | 11/2012 | Valsan | |
| 8,527,276 B1* | 9/2013 | Senior .................... | G06N 3/084 704/258 |
| 2005/0267739 A1* | 12/2005 | Kontio .................... | G06N 3/086 704/205 |
| 2006/0190254 A1* | 8/2006 | Iser et al. ........................ | 704/243 |
| 2009/0012785 A1 | 1/2009 | Chengalvarayan | |
| 2009/0210218 A1 | 8/2009 | Collobert et al. | |
| 2011/0264447 A1* | 10/2011 | Visser et al. ................... | 704/208 |
| 2012/0166186 A1* | 6/2012 | Acero et al. ................... | 704/205 |
| 2013/0212052 A1* | 8/2013 | Yu ............................. | G06N 3/08 706/25 |
| 2014/0067735 A1* | 3/2014 | Yu ............................. | G06N 3/04 706/20 |
| 2014/0142929 A1* | 5/2014 | Seide ........................ | G06N 3/08 704/202 |

FOREIGN PATENT DOCUMENTS

EP    0454037 A2    10/1991

OTHER PUBLICATIONS

Yao et al., Adaptation of context-dependent deep neural networks for automatic speech recognition, IEEE Dec. 2-5, 2012.*

Li, et al., "Improving Wideband Speech Recognition Using Mixed-Bandwidth Training Data in CD-DNN-HMM", Retrieved at <<http://ieeexplore.ieee.org/stamp/stamp.jsp?tp=&arnumber=6424210>>, In Proceedings IEEE Workshop on Spoken Language Technology, Dec. 2, 2012, pp. 1-6.

(Continued)

*Primary Examiner* — Barbara Reinier
(74) *Attorney, Agent, or Firm* — Alin Corie; Sandy Swain; Micky Minhas

(57) ABSTRACT

Technologies pertaining to training a deep neural network (DNN) for use in a recognition system are described herein. The DNN is trained using heterogeneous data, the heterogeneous data including narrowband signals and wideband signals. The DNN, subsequent to being trained, receives an input signal that can be either a wideband signal or narrowband signal. The DNN estimates the class posterior probability of the input signal regardless of whether the input signal is the wideband signal or the narrowband signal.

20 Claims, 7 Drawing Sheets

(56) References Cited

OTHER PUBLICATIONS

Hinton, et al., "Deep Neural Networks for Acoustic Modeling in Speech Recognition", Retrieved at <<http://psych.stanford.edu/~jlm/pdfs/Hinton12IEEE_SignalProcessingMagazine.pdf>>, In Proceedings of IEEE Signal Processing Magazine, Apr. 27, 2012, pp. 1-27.

Mohamed, et al., "Acoustic Modeling using Deep Belief Networks", Retrieved at <<http://www.cs.toronto.edu/~hinton/absps/speechDBN_jrnl.pdf>>, In Journal Transactions on Audio, Speech, and Language Processing, Mar. 23, 2011, pp. 1-10.

Yu, et al., "Roles of Pretraining and Fine-Tuning in Context-Dependent DNN-HMMs for Real-World Speech Recognition", In Proc. NIPS Workshop on Deep Learning and Unsupervised Feature Learning, Dec. 2010, pp. 1-8.

Dahl, et al., "Context-Dependent Pre-trained Deep Neural Networks for Large Vocabulary Speech Recognition", IEEE Trans. Speech and Audio Proc., vol. 20, No. 1, 2012, pp. 1-13.

Jaitly, "An Application of Pretrained Deep Neural Networks to Large Vocabulary Conversational Speech Recognition", Tech. Rep. 001, Department of Computer Science, University of Toronto, 2012, pp. 1-11.

Sainath, et al., "Making Deep Belief Networks Effective for Large Vocabulary Continuous Speech Recognition", in Proc. ASRU 2011, 2011, pp. 1-6.

Yu, et al., "Automated Directory Assistance System—From Theory to Practice", in Proc. Interspeech, 2007, pp. 1-4.

Moreno, et al., "Sources of Degradation of Speech Recognition in the Telephone Network", in Proc. ICASSP, Adelaide, Australia, vol. 1, Apr. 1994, pp. 109-112.

Seltzer, et al., "Training Wideband Acoustic Models Using Mixed-Bandwidth Training Data for Speech Recognition", IEEE Transactions on Audio, Speech, and Language Processing, vol. 15, No. 1, 2007, pp. 235-245.

Seltzer, et al., "Robust Bandwidth Extension of Noise-Corrupted Narrowband Speech", in Proc. Interspeech, 2005, pp. 1509-1512.

Vanhoucke, et al., "Improving the Speed of Neural Networks on CPUs", in Proc. Deep Learning and Unsupervised Feature Learning Workshop, NIPS, 2011, pp. 1-8.

Mohamed, et al., "Understanding how Deep Belief Networks Perform Acoustic Modelling", in Proc. ICASSP, 2012, pp. 1-4.

Povey, et al., "fMPE: Discriminatively Trained Features for Speech Recognition", in Proc. ICASSP, 2005, pp. 1-8.

Povey, et al., "Boosted MMI for Model and Feature Space Discriminative Training", in Proc. ICASSP, 2008, pp. 1-4.

Mohamed, et al., "Investigation of Full-Sequence Training of Deep Belief Networks for Speech Recognition", in Proc. Interspeech 2010, Sep. 2010, pp. 2846-2849.

Fan, et al., "Joint Encoding of the Waveform and Speech Recognition Features Using a Transform CODEC", in Proc. ICASSP, May 2011, pp. 5148-5151.

Seide, et al., "Conversational Speech Transcription Using Context-Dependent Deep Neural Networks,", in Proc. Interspeech 2011, 2011, pp. 437-440.

\* cited by examiner

EXPLOITING HETEROGENEOUS DATA IN DEEP NEURAL NETWORK-BASED SPEECH RECOGNITION SYSTEMS

BACKGROUND

Computer-implemented recognition systems have been designed to perform a variety of recognition tasks. Such tasks include analysis of a video signal to identify humans captured in such signal, analysis of a video signal to identify a gesture performed by a human, analysis of a video signal to recognize an object therein, analysis of a handwriting sample to identify characters included in the handwriting sample, analysis of an audio signal to determine an identity of a speaker captured in the audio signal, analysis of an audio signal to recognize spoken words, amongst others.

With respect to automatic speech recognition (ASR) systems, such systems are becoming increasingly ubiquitous. For example, mobile telephones are currently equipped with ASR systems that are configured to recognize spoken commands set forth by users thereof, thus allowing the user to perform other tasks while setting forth commands to mobile telephones. Gaming consoles have also been equipped with ASR systems that are likewise configured to recognize certain spoken commands, thereby allowing users of such gaming consoles to interact with the gaming consoles without requiring use of a handheld game controller. Still further, customer service centers accessible by telephone employ relatively robust ASR systems to assist users in connection with obtaining desired information. Accordingly, a user can access a customer service center by telephone, and set forth one or more voice commands to obtain desired information (or to be directed to an operator that can assist the user in obtaining the information).

With continuing reference to ASR systems, it can be relatively difficult to obtain suitable training data for training the ASR system prior to deploying the ASR system for real-world use. At least a portion of this difficulty is based upon the increased use of devices that capture wideband audio signals but the dearth of wideband signals that can be used for training. In an example, a sampling rate utilized to capture speech data generally depends upon the device that captures the speech data. For instance, mobile telephones that have relatively recently become available are configured capture wideband signals by sampling acoustic signals at a first sampling rate (e.g., 16 kHz), while older mobile telephones and landline telephones are configured to capture narrowband signals by sampling acoustic signals at a second, lower sampling rate (e.g., 8 kHz). There is currently a relatively large amount of narrowband data available for training ASR systems, there is currently a smaller amount of wideband data available for training ASR systems. Adding to the difficulty in connection with obtaining training data, certain signals may be subject to environmental or channel distortion.

Several approaches have been set forth for training ASR systems while considering the heterogeneous nature of at least some training data. For instance, wideband signals in training data can be down-sampled, such that the wideband signals are converted to narrowband signals. The ASR system is then trained using only narrowband signals. This approach is clearly suboptimal, as the wideband data includes additional information that may be useful to identify phones therein. Another approach is to up-sample the narrowband signals (e.g., extend the bandwidth of the narrowband signals in the training data). Procedures for up-sampling narrowband data, however, can be complicated and often introduce errors.

Still yet another exemplary approach is to build and train two separate ASR systems: one trained using wideband signals and configured to perform recognition tasks over wideband signals, and one trained using narrowband signals and configured to perform recognition tasks over narrowband signals. As noted above, however, currently there exists a relatively large amount of narrowband training data, while there is a dearth of wideband training data.

SUMMARY

The following is a brief summary of subject matter that is described in greater detail herein. This summary is not intended to be limiting as to the scope of the claims.

Described herein are various technologies pertaining to training a recognition system utilizing heterogeneous data (where some data has a full set of features while other data is missing features). Also described herein are various technologies pertaining to the utilization of a recognition system that is configured to perform a recognition task regardless of whether a feature vector can be fully populated based upon an input signal or whether a portion of the feature vector remains unpopulated (e.g., the input signal is missing features).

A recognition system (e.g. an automatic speech recognition (ASR) system) can include a deep neural network (DNN), which includes a plurality of layers. With more specificity, the DNN includes an observation layer, which receives a feature vector extracted from a captured observation. Such captured observation may be a video signal, an acoustic signal (e.g., captured speech), an image, etc. The DNN further includes a plurality of hidden layers, wherein each hidden layer in the plurality of hidden layers comprises a respective plurality of nodes. Each node in each hidden layer is configured to perform a non-linear or linear transformation on its respective input. The hidden layers are stacked one on top of another in the DNN, such that an input to a node in a particular layer is based upon output of a node in an immediately adjacent layer therebeneath. The DNN further includes an output layer, which comprises modeling units that are desirably detected from the captured observation. With respect to ASR systems, such units may be phones or senones.

The DNN, during a training phase, can be trained using heterogeneous data that comprises at least a first set of data and a second set of data. When features are extracted from a sample in the first set of data, a feature vector is fully populated. When features are extracted from a sample in the second set of data, however, at least a portion of the feature vector is unpopulated (e.g., samples in the second set of data have missing features). With respect to the second set of data, the unpopulated portion of the feature vector can be automatically populated, and both the first set of data and the second set of data can be utilized to train the DNN. For instance, the unpopulated portion of a feature vector can be assigned the value of zero (zero-padded), assigned a mean value determined from the corresponding feature vectors of samples in the first set of training data (mean-padded), or the like. The DNN trained through utilization of the heterogeneous training data can be deployed and can perform recognition tasks over input data, regardless of whether the input data is missing features.

In an exemplary embodiment, the recognition system can be an ASR system. The first set of training data can include speech signals sampled at a first sampling rate (e.g. 16 kHz), and the second set of training data can include speech signals sampled at a second, lower sampling rate (e.g., 8 kHz). It can be ascertained that the speech signals in the first set of training data include data at higher frequency bands when compared to the speech signals in the second set of training data. For example, the speech signals sampled at 8 kHz include information in the frequency range between 0 kHz and 4 kHz, while the speech signals sampled at 16 kHz include information in the frequency range between 0 and 8 kHz.

In another exemplary embodiment, log filter banks can be employed in connection with extracting features from respective frames of the speech signals (sampled at either of the aforementioned sampling rates). For the wideband signals, this can result in a fully populated feature vector, while for the narrowband speech signals, at least some of the feature vector corresponding to a frame of the lower quality speech signal is unpopulated. As indicated above, the DNN can be trained using such heterogeneous data. The resultant trained DNN may then be deployed in an ASR system.

With respect to the deployed DNN, when an input speech signal is received, for each frame of the captured speech signal, features can be extracted therefrom and utilized to populate a feature vector. If the feature vector is fully populated, the DNN trained using heterogeneous data can act in a conventional manner (e.g., output a probability distribution over senones). If the feature vector is not fully populated (the received speech signal is a narrowband signal), then the unpopulated portion of the feature vector can be automatically populated, and the DNN can output a probability distribution over senones based upon the input signal.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
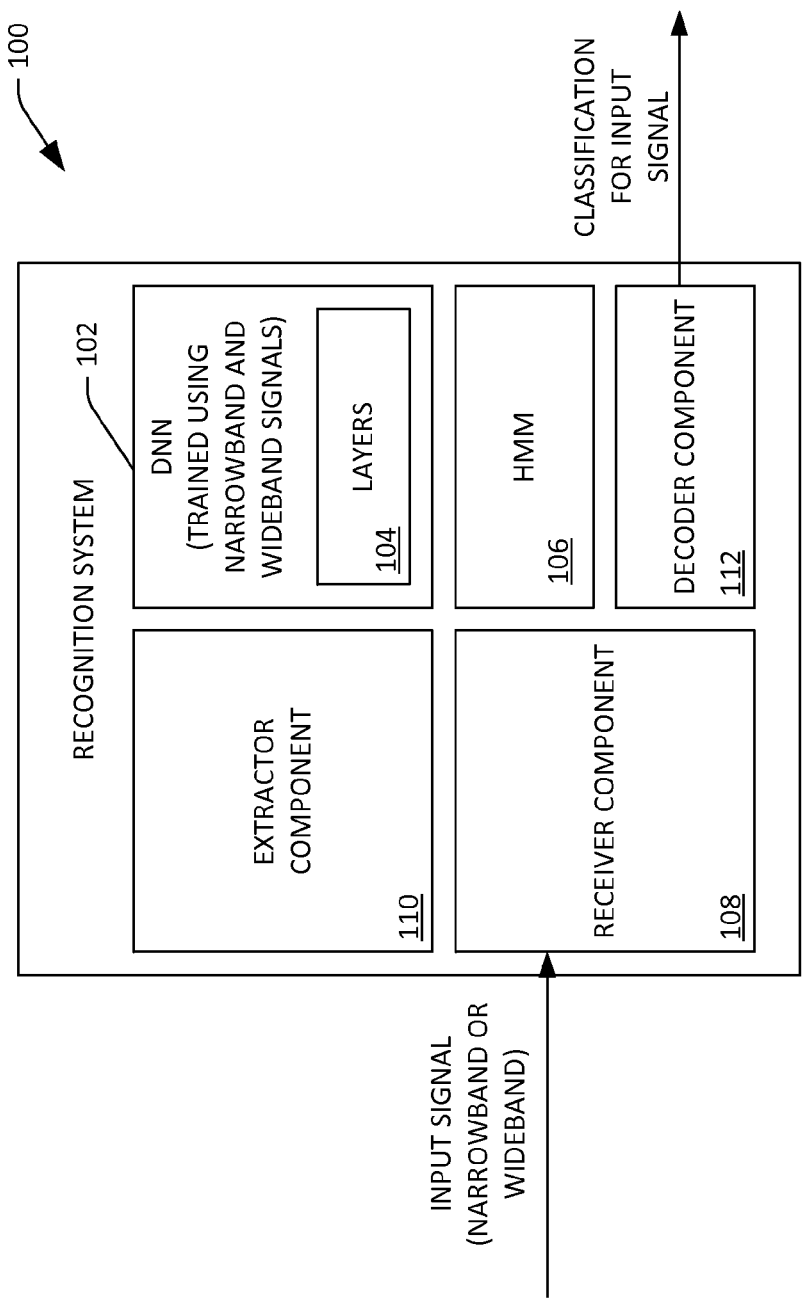
FIG. 1 is a functional block diagram of an exemplary recognition system that includes a deep neural network (DNN) trained using heterogeneous data.

Various technologies pertaining to training a deep neural network (DNN) using heterogeneous data are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, an exemplary recognition system 100 that can be employed in a computing device is illustrated. Pursuant to an example, the recognition system 100 may be used in a client-side computing device, such as a desktop computing device, a mobile computing device (a mobile telephone, a tablet computing device, etc.), a videogame console, a television, etc. In other embodiments, the recognition system 100 can be included in a server or distributed across servers. For instance, the recognition system 100 can be deployed in connection with a customer service center that is accessible by way of a telephone.

The recognition system 100 can be configured to perform any suitable recognition task. For example, the recognition system 100 may be an automatic speech recognition (ASR) system. It is to be understood that while examples set forth herein pertain to ASR systems, the hereto-appended claims are not intended to be so limited. For example, the recognition system 100 can be configured to recognize identities of people in images or video signals, recognize handwritten characters in images or through analysis of user interaction with a touch sensitive device, recognize objects in images or video signals, recognize identities of speakers in an audio signal, etc.

The recognition system 100 includes a DNN 102, wherein the DNN 102 is trained using heterogeneous training data. The DNN 102 includes a plurality of layers 104. The plurality of layers 104 include an input layer that receives a feature vector, wherein entries of the feature vector correspond to features extracted from a frame of a captured observation. Such captured observation may be an image, a video signal, an acoustic signal, etc. The layers 104 also include a plurality of hidden layers, wherein each hidden layer in the plurality of hidden layers comprises a respective plurality of nodes. For instance, the plurality of hidden layers can include at least three hidden layers. In an exemplary embodiment, the number of hidden layers may be up to 100 hidden layers, up to 1000 hidden layers, etc. Further, each hidden layer includes a relatively large number of nodes. In an exemplary embodiment, each hidden layer in the layers 104 can include at least one hundred nodes, and up to tens of thousands of nodes. The hidden layers in the plurality of layers 104 are stacked one on top of the other, such that input received at a node of a hidden layer is based upon output of a node in an immediately adjacent layer beneath such hidden layer. Further, each node is configured to perform a nonlinear or linear transformation over its respective input.

The layers 104 also include an output layer that comprises modeling units that are desirably detected utilizing the DNN 102. For example, with respect to an ASR system, such units may be phones or senones. In other examples, the units may be gestures or portions thereof, objects or portions thereof, etc.

As mentioned above, the DNN 102 is trained using heterogeneous training data. Heterogeneous training data, as used herein, is intended to refer to training data of different quality. For instance, the heterogeneous training data may include first training data, wherein a feature vector is fully populated when features are extracted from respective samples in the first training data. The heterogeneous training data may also include second training data, wherein the feature vector is at least partially unpopulated when features are extracted from respective samples in the second training data. Therefore, with respect to at least some samples utilized to train the DNN 102, features considered when training the DNN 102 are missing in such samples.

With more particularity, the heterogeneous data utilized to train the DNN 102 can include wideband training data that comprises wideband signals and narrowband training data that comprises narrowband signals. When features are extracted from a wideband signal, a resultant feature vector is more fully populated when compared to when features are extracted from a narrowband signal. Therefore, for example, a narrowband signal may lack information for frequencies that is included in a wideband signal. More specific examples of wideband and narrowband signals will be set forth below.

Prior to training of the DNN 102, entries in unpopulated portions of feature vectors corresponding to narrowband data can be automatically populated. For instance, the unpopulated portions of the feature vectors can be each be assigned a value of zero (zero-padded), can each be assigned a mean value of their corresponding values in the wideband data (mean-padding), can each be assigned a value randomly (within a specified range), etc.

The recognition system 100 may additionally include a Hidden Markov Model (HMM) 106, which can be employed to model transition probabilities between units modeled by the DNN 102. In ASR systems, utilization of DNN-HMM systems has been shown to have relatively high accuracy rates when compared to conventional Gaussian Mixture Model (GMM)—HMM ASR systems.

The recognition system 100 further comprises a receiver component 108 that receives an input signal, wherein the input signal is one of a wideband signal or a narrowband signal. For example, whether the input signal is a wideband signal or narrowband signal may depend upon a device utilized to capture the input signal. For instance, many mobile telephones are configured to capture speech input using a sampling rate of 16 kHz, while landline telephones are configured to sample speech data at a sampling rate of 8 kHz. Thus, if the input signal is received from a certain type of mobile telephone, the input signal may be a wideband signal; while if received from a landline telephone, the input signal may be a narrowband signal. Likewise, speech signals captured from Bluetooth accessories tend to be sampled at a sampling rate of 8 kHz. Compared to speech signals captured by way of many mobile telephones, signals captured by way of Bluetooth accessories can be narrowband signals.

The recognition system 100 also includes an extractor component 110 that, for each frame of the input signal, extracts a plurality of features therefrom. With respect to an image, features extracted by the extractor component 110 for a pixel or window of pixels can be or include intensity, average intensity, mean intensity, intensity gradient, color gradient, or the like. If the input signal is a speech signal, such features can be Mel-frequency cepstral coefficients (MFCCs) or perceptual linear prediction (PLP) features. In still yet another example, features extracted by the extractor component 110 can be log filter bank features, such as, Mel-scale log filter bank features.

Thus, for each frame, the extractor component 110 populates a feature vector (feature set) that is representative of a respective frame of the input signal. The feature vector includes a plurality of entries that, for example, can represent features at differing frequency bands. As indicated above, narrowband signals may lack features; accordingly, the extractor component 110 extracts the available features for the frame and populates the feature vector with such available features. The extractor component 110 may further populate missing entries in the feature vector with certain values. Values assigned by the extractor component 110 may be zeros, randomly selected values in some set range, mean values corresponding to observed values for such features, etc.

The extractor component 110 can provide the resultant feature vector to the input layer of the DNN 102, resulting in generation of a probability distribution over modeled units and (based upon the transition probabilities modeled by the HMM 106). Further, the recognition system 100 may be a context-dependent recognition system, such that the input layer of the DNN 102 receives feature vectors of respective frames that surround the aforementioned frame.

A decoder component 112 receives the output of the DNN/HMM, and assigns a classification to the input signal based upon values of the output layer of the DNN 102 regardless of whether the input signal is a narrowband signal or wideband signal. Experimental results have indicated that recognition accuracy of a DNN trained using heterogeneous data as described above is an improvement over recognition systems trained using solely wideband data and/or recognition systems trained solely using narrowband data.

An exemplary embodiment where the recognition system 100 is an ASR system is now provided. Again, it is to be understood that the hereto-appended claims are not intended to be limited to ASR systems. The DNN 102 can be trained using training data that includes wideband speech signals and narrowband speech signals, where wideband speech signals are those sampled at a sampling rate of 16 kHz and narrowband signals are speech signals sampled at a sampling rate of 8 kHz. Thus, the narrowband signals in the training data include information only in the frequency range between 0 kHz and 4 kHz, while the wideband signals in the training data include information in the frequency range between 0 kHz and 8 kHz.

To train the DNN 102, first a conventional GMM-HMM system can be built using the heterogeneous training data (the narrowband training data and the wideband training data). This can be accomplished by first down-sampling the wideband training data. The resultant built GMM-HMM can then be used to align the training data. This allows the DNN 102 to inherit the model structure including the phone set, the HMM topology, and the tying of context-dependent states directly from the GMM-HMM system. Further, senone labels used for training the DNN 102 can be extracted from the forced alignment of the training data generated using the GMM-HMM. Details pertaining to bridging between a context-dependent (CD) GMM-HMM and a CD-DNN-HMM, as well as the learning rate and momentum values used in various experiments can be found in Dahl, et al., "Context-Dependent pre-trained Deep Neural Networks for Large Vocabulary Speech Recognition", IEEE Trans. Speech and Audio Proc., vol. 20, no. 1, pp. 30-42, 2012, the entirety of which is incorporated herein by reference.

In an exemplary embodiment, features utilized during training of the DNN 102 can be log filter bank features. For instance, 22 Mel-scale filter banks can be employed for the narrowband data, and 29 Mel-scale filter banks can be employed for the wideband data. Thus, the lower 22 filter banks for the wideband data can span between 0 kHz and 4 kHz, and can be shared with the 22 filter banks for the narrowband data. The higher seven filter banks for the wideband data can span between 4 kHz and 8 kHz, with the central frequency of the first higher filter bank being 4 kHz. During training, as mentioned above, for the narrowband data, the seven upper filter banks can be padded with any suitable value (zero padding or mean padding). The log values of the filter banks are used to form input vectors to train the DNN 102.

The trained DNN 102, using both wideband and narrowband data, may then be deployed to perform recognition tasks over wideband or narrowband input signals. For example, the receiver component 108 can receive an input speech signal which can be either a wideband or narrowband signal. For each frame of the input signal, the extractor component 110 can utilize the aforementioned filter banks to extract log filter bank features from a respective frame. If the input signal is a narrowband signal, the extractor component 110 can populate entries corresponding to the seven filter banks representing the higher frequencies with suitable values, and can provide the resultant fully populated feature vector to the DNN 102, where such feature vector is received at the input layer of the DNN 102. The decoder component 112 then performs a classification task based upon the output of the DNN 102. Conversely, if the input signal is a wideband signal, the extractor component 110 can employ the 29 filter banks to populate the entirety of the feature vector and provide such feature vector to the input layer of the DNN 102.

Figure 2:
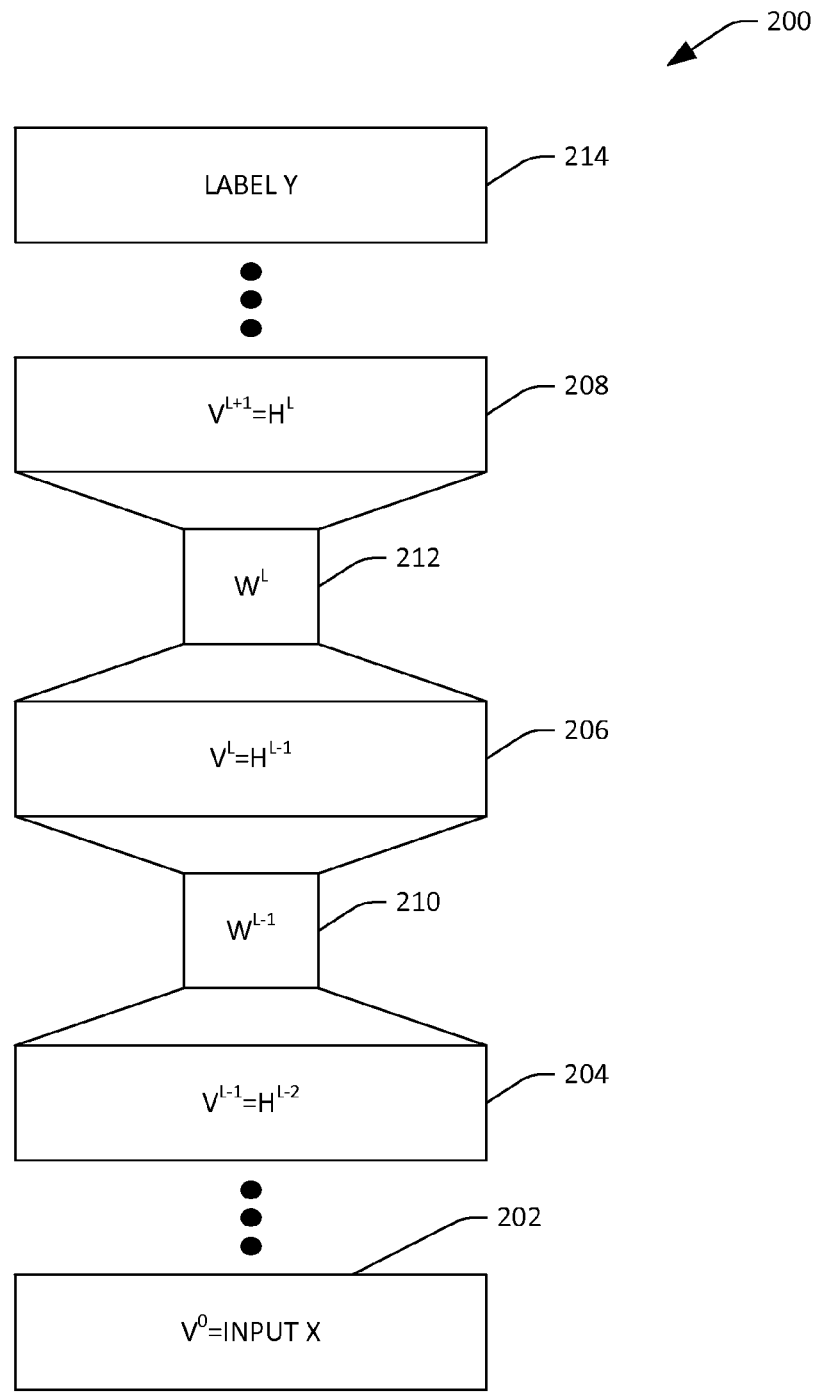
FIG. 2 illustrates an exemplary DNN.

Now turning to FIG. 2, a graphical representation of an exemplary DNN 200 is illustrated. The DNN 200 comprises an input layer 202, which captures an input feature vector $V^0$. The input is denoted in FIG. 2 by X, which is an I×1 vector. The DNN further comprises a plurality of hidden layers 204-208. Each of the hidden layers 204-208 comprises a respective plurality of hidden units (nodes), and wherein each hidden unit comprises a respective activation function. Hidden units in adjacent layers are potentially connected by way of weighted synapses, which can be collectively represented by weight matrices 210 and 212 between hidden layers. As shown, the weight matrix 210 represents weighted synapses between hidden units in the hidden layer 204 (hidden layer $H^{L-2}$) and hidden units in the hidden layer 206 (hidden layer $H^{L-1}$). Similarly, the weight matrix 212 represents weighted synapses between hidden units in the hidden layer 206 and hidden units in the hidden layer 208 (hidden layer $H^L$). A layer 214 in the DNN 200 is the output, which is determined based upon the weighted synapses and activation functions of hidden units in the DNN 200. The output is denoted in FIG. 2 as Y. During training, weights corresponding to the weight matrices 210 and 212 can be learned, as well as weight biases, using heterogeneous training data.

Figure 3:
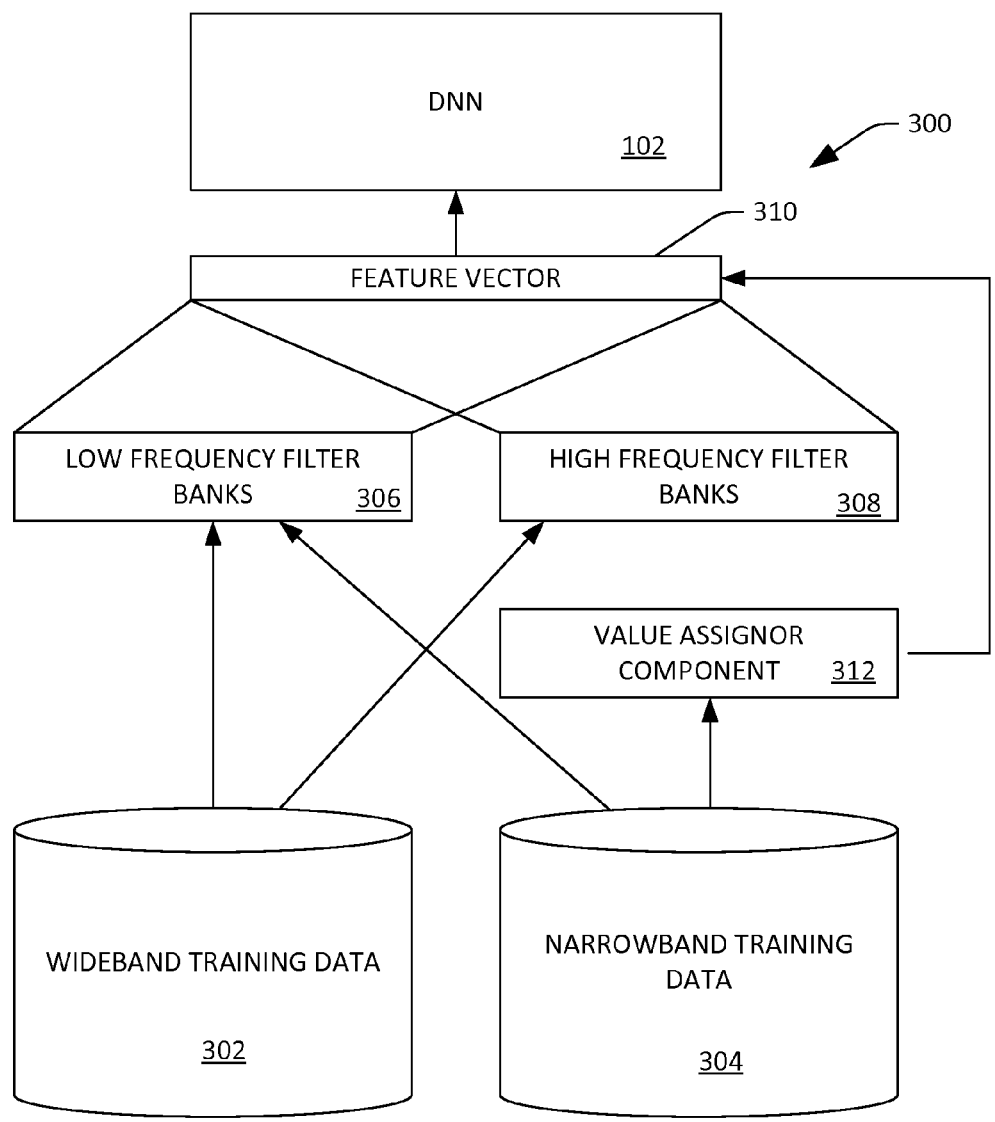
FIG. 3 illustrates a functional block diagram of an exemplary system that facilitates training a DNN using heterogeneous training data.

Now referring to FIG. 3, an exemplary system 300 that facilitates training the DNN 102 using both wideband and narrowband training data is illustrated. The system 300 includes a first data repository 302 that comprises wideband training data (including wideband signals) and a second data repository 304 that comprises narrowband training data (including narrowband signals). While shown as being separate repositories, it is to be understood that the wideband training data and the narrowband training data can be retained in a single repository, and the separation of the wideband training data and the narrowband training data in FIG. 3 is undertaken for purposes of explanation only. For the example set forth here, the narrowband training data in the second data repository 304 includes narrowband signals that are missing information over a range of frequencies that is included in the wideband signals of the wideband training data.

The system 300 includes low frequency filter banks 306 and high frequency filter banks 308. As the wideband signals include information in both a low frequency range and high frequency range, both the low frequency filter banks 306 and the high frequency filter banks 308 can be applied over signals in the wideband signals. A feature vector 310 that is provided to the DNN 102 as input for purposes of training includes output of both the low frequency filter banks 306 and the high frequency filter banks 308.

For the narrowband signals in the second data repository 304, however, high frequency data is not included therein (e.g., the narrowband signals lack features corresponding to the high frequency filter banks 308). The low frequency filter banks 306 can be applied to narrowband signals in the second repository 304 such that, for each frame of a narrowband signal, the feature vector 310 can be partially populated with values from the low frequency filter banks 306. As mentioned above, however, the narrowband signals do not include the high frequency data. Thus, the system 300 can include a value assignor component 312 that can populate portions of the feature vector 310 that are unpopulated. The feature vector 310 may then be provided to the input layer of the DNN 102. Such process can be undertaken for each frame in the wideband signals, as well as each frame in the narrowband signals, resulting in the DNN 102 being trained using both the wideband training data and the narrowband training data.

Figure 4:
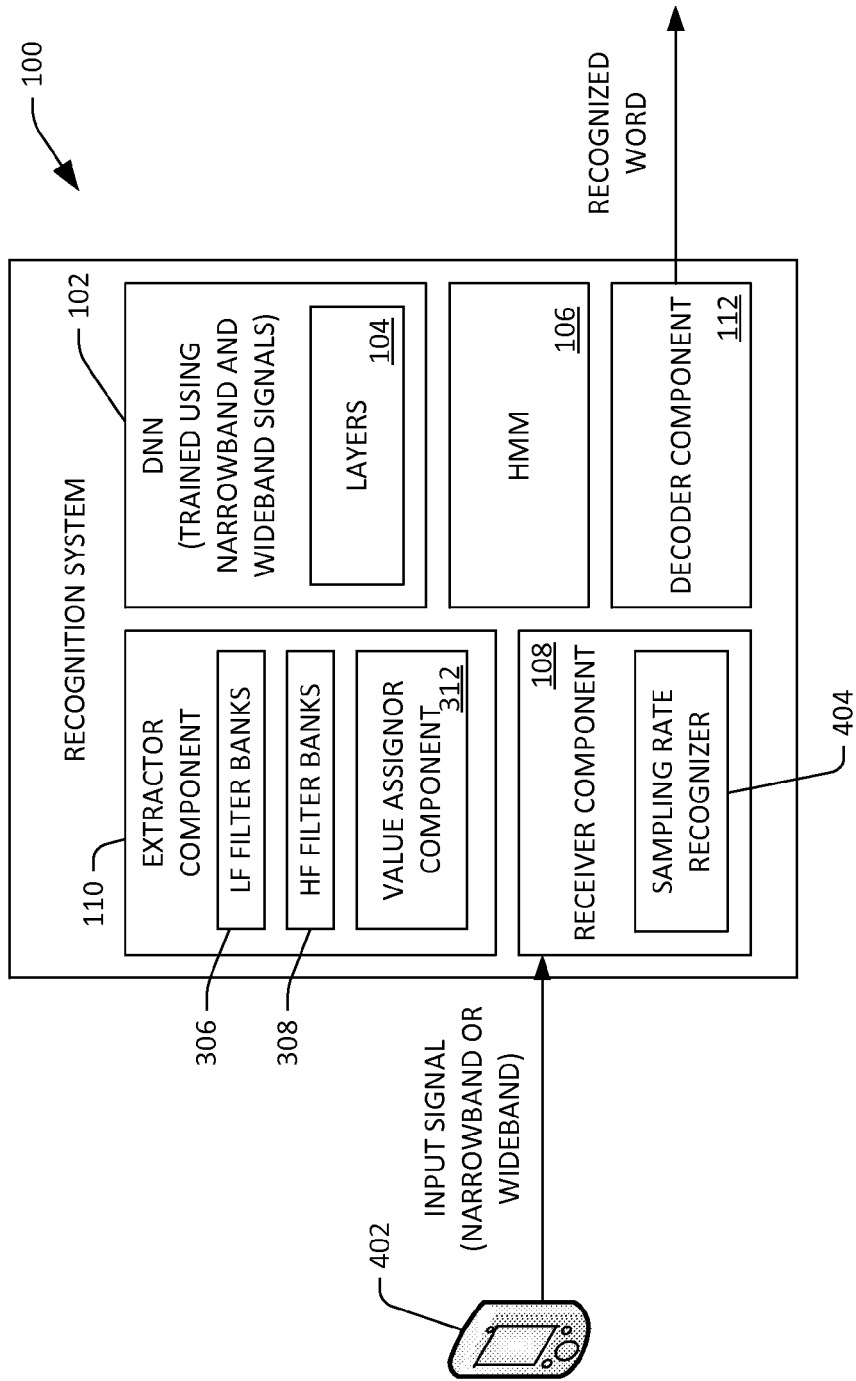
FIG. 4 is a functional block diagram of an exemplary automatic speech recognition (ASR) system that includes a DNN trained using wideband and narrowband training data.

With reference now to FIG. 4, an exemplary embodiment of the recognition system 100 is illustrated. The recognition system 100 receives the input signal from a particular device 402. While shown as being a mobile telephone, the device 402 may be any suitable device that captures the input signal. The receiver component 108 includes a sampling rate recognizer component 404, which recognizes a sampling rate of the device 402. The extractor component 110 receives the input signal and the recognized sampling rate from the sampling rate recognizer component 404. If the sampling rate of the device 402 corresponds to a wideband signal, for each frame in the input signal, the extractor component 110, using both the low frequency filter banks 306 and the high frequency filter banks 308, populates a respective feature vector and provides such feature vector to the DNN 102. If the sampling rate of the device 402 corresponds to a narrowband signal, for each frame in the input signal, the extractor component 110 uses the low frequency filter banks 306 to partially populate a feature vector, and utilizes the value assignor component 312 to assign values to the unpopulated portion of the feature vector (where the input signal is missing features). Thus, if the input signal is a narrowband signal, for each frame of the input signal, the DNN 102 is provided with a respective feature vector that includes values output by the low frequency filter banks 308 and values assigned to the feature vector by the value assignor component 312. It is thus to be understood that the DNN 102 is configured to perform a classification task over the input signal regardless of whether the input signal is a wideband or narrowband signal. As shown in FIG. 4, the classification task can be recognition of a word in the input signal.

The techniques described above may also be employed in connection with training what can be referred to as a bottleneck feature for utilization in a conventional GMM-HMM system. In such approach, at least one hidden layer of the DNN 102 includes very few nodes, thus forming a bottleneck in the DNN 102. Layers above such bottleneck layer can be removed, as well as the nonlinearity of such bottleneck layer (after training) The modified DNN 102 can be used to generate bottleneck features which are employed in conventional GMM-HMM systems as input.

Figure 5:
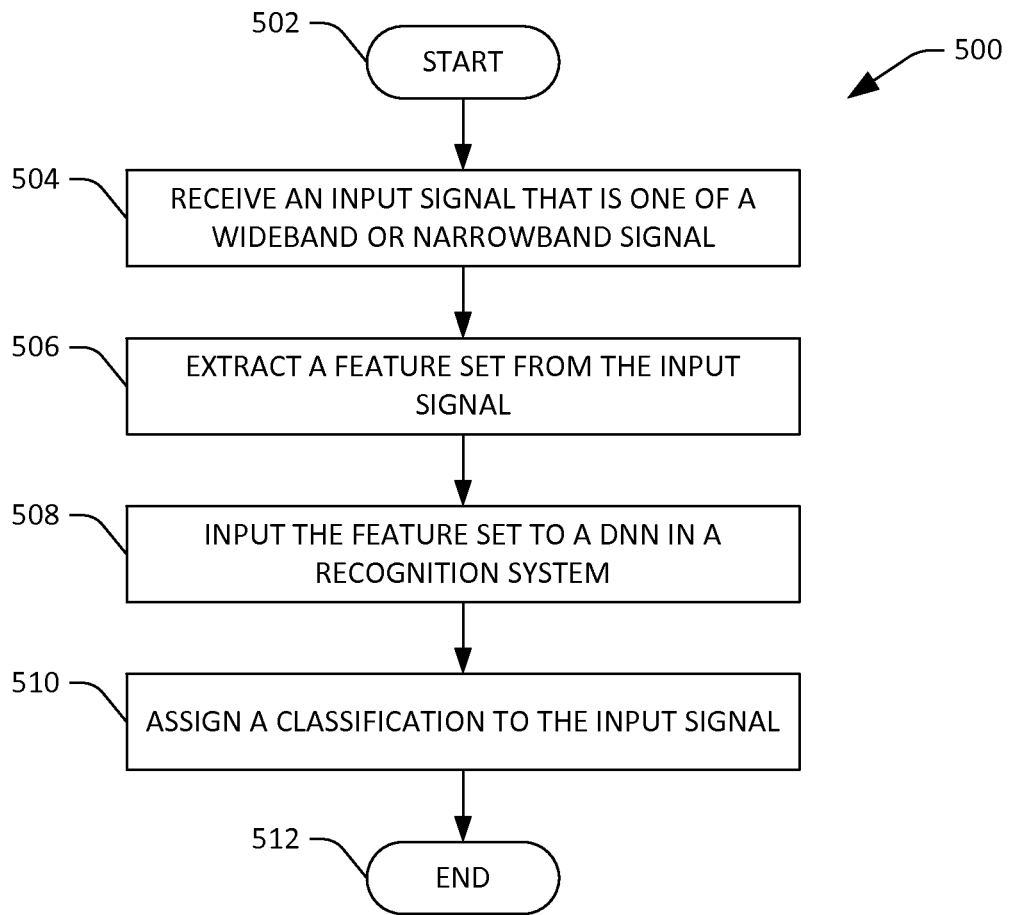
FIG. 5 is a flow diagram that illustrates an exemplary methodology for utilizing a DNN trained using heterogeneous data to assign a classification to an input signal.
Figure 6:
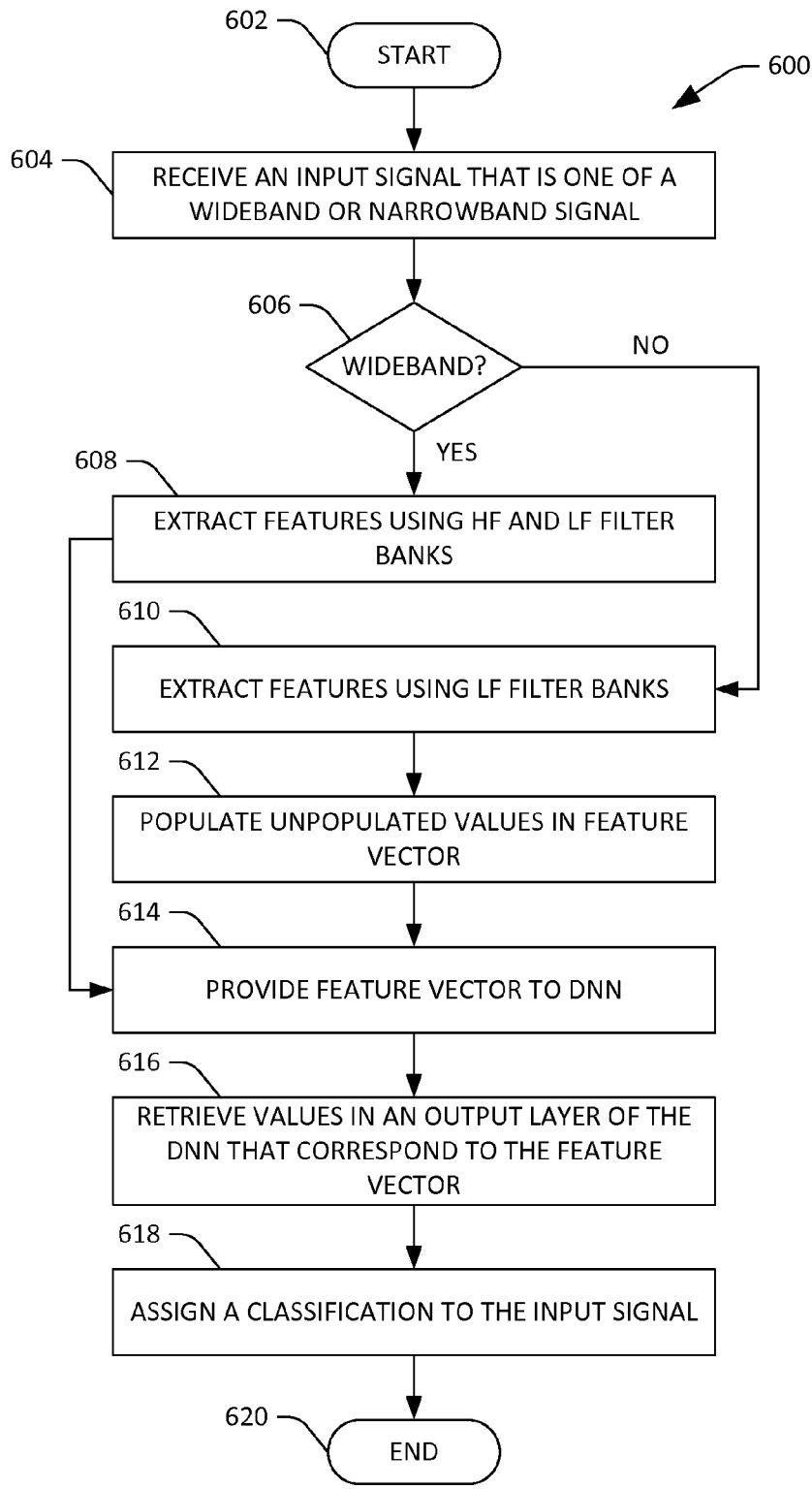
FIG. 6 is a flow diagram that illustrates an exemplary methodology for assigning a classification to an input signal regardless of whether the input signal is a wideband or narrowband signal using a DNN trained using both wideband and narrowband training data.

FIGS. 5-6 illustrate exemplary methodologies relating to a DNN trained using heterogeneous training data. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 5, an exemplary methodology 500 for performing a classification task over an input signal regardless of whether the input signal is a wideband signal or a narrowband signal is illustrated. The methodology 500 starts at 502, and at 504 an input signal that is one of a wideband signal or a narrowband signal is received. Such input signal may be a speech signal, a video signal, or the like.

At 506, a feature set is extracted for a frame of the wideband signal or the narrowband signal, wherein the narrowband signal has fewer features when compared to the wideband signal. In other words the narrowband signal is missing features that are included in the wideband signal.

At 508, the feature set is input to a DNN in a recognition system regardless of whether the input signal is the wideband signal or the narrowband signal. The DNN has been trained using both wideband signals and narrowband signals, and generates an output responsive to the inputting of the feature set to the DNN. At 510, a classification is assigned to the input signal based upon the output of the DNN. The methodology 500 completes at 512.

With reference now to FIG. 6, an exemplary methodology 600 for assigning a classification to an input signal regardless of whether the input signal is a wideband signal or a narrowband signal is illustrated. The methodology 600 starts at 602, and at 604 an input signal is received, wherein the input signal is one of a wideband signal or a narrowband signal. For example, the wideband signal can be a voice signal sampled at a first sampling rate, and the narrowband signal can be a voice signal sampled at a second sampling rate that is less than the first sampling rate.

At 606, a determination is made regarding whether the input signal is a wideband signal. If at 606 it is determined that the input signal is a wideband signal, then at 608 log filter bank features are extracted from the wideband signal using both high frequency and low frequency filter banks. For example, the low frequency filter banks can correspond to a frequency range between 0 kHz and 4 kHz, while the high frequency filter banks can correspond to a frequency range between 4 kHz and 8 kHz.

If it is determined at 606 that the input signal is not a wideband signal, then at 610 features are extracted from the narrowband signal using only the low frequency filter banks Subsequently, at 612, unpopulated values in the feature vector are populated. Such unpopulated entries in the feature vector may be entries corresponding to the high frequency filter banks.

At 614, after the feature vector has been populated at 612, or after features have been extracted using both the high frequency and low frequency filter banks at 608, then the feature vector is provided to the DNN at 614. As indicated above, the DNN comprises a plurality of parameters with values learned during a training phase based upon both wideband signals and narrowband signals. At 616, values in an output layer of the DNN that correspond to the feature vector provided at 614 are retrieved, and at 618 a classification is assigned to the input signal. Such classification can be, for instance, the recognition of at least one word in the input signal based upon the values extracted from the output layer of the DNN. It is to be understood that at least one word is recognized regardless of whether the input signal is a wideband signal or narrowband signal. The methodology 600 completes at 620.

Figure 7:
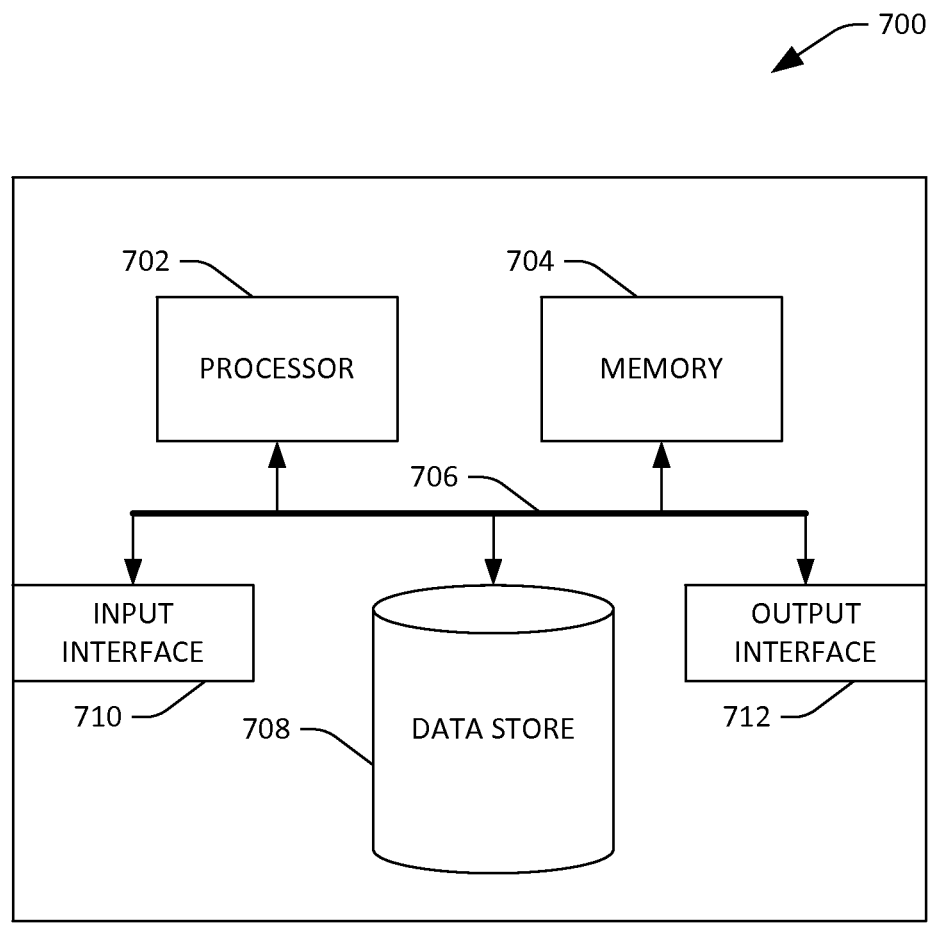
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be used in a system that supports training a DNN using heterogeneous training data. By way of another example, the computing device 700 can be used in a system that supports performing a classification task through use of a DNN that has been trained based upon heterogeneous training data. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store wideband signals, narrowband signals, feature vectors, etc.

The computing device 700 additionally includes a data store 708 that is accessible by the processor 702 by way of the system bus 706. The data store 708 may include executable instructions, wideband signals, narrowband signals, feature vectors, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method, comprising:
   receiving an input signal that is one of a wideband signal or a narrowband signal, the input signal indicative of a spoken utterance captured by a microphone;
   extracting features from the one of the wideband signal or the narrowband signal for inclusion in a feature set;
   inputting the feature set to a deep neural network (DNN) in a speech recognition system regardless of whether the input signal is the wideband signal or the narrowband signal, the DNN being trained using a set of wideband signals and a set of narrowband signals, the set of narrowband signals independent from the set of wideband signals, wherein the DNN generates an output responsive to the inputting of the feature set to the DNN;
   recognizing a word in the spoken utterance based upon the output of the DNN; and
   performing a computing operation based upon the word, wherein the method is executed by a processor of a computing device.

2. The method of claim 1, wherein the input signal is a voice signal, wherein the wideband signal is the voice signal sampled at a sampling rate of at least 16 kHz, and wherein the narrowband signal is the voice signal sampled at sampling rate of no more than 8 kHz.

3. The method of claim 1, wherein the input signal is the wideband signal, the method further comprising:
   subsequent to the assigning of the classification to the input signal based upon the output of the DNN, receiving a second input signal, the second input signal being a narrowband signal;
   extracting second features from the second input signal for inclusion in a second feature set, the second feature set having an unpopulated portion;
   assigning values to the unpopulated portion of the second feature set;

inputting the second feature set to the DNN, the DNN generating a second output responsive to the inputting of the second feature set to the DNN; and assigning a second classification to the second input signal based upon the second output of the DNN.

4. The method of claim 1, wherein the input signal is a voice signal, and wherein the classification is a recognition of at least one word in the voice signal.

5. The method of claim 1, wherein the narrowband signal has missing data at frequencies captured in the wideband signal.

6. The method of claim 1, wherein the DNN comprises at least three hidden layers, wherein each hidden layer in the at least three hidden layers comprises a respective plurality of nodes, and wherein each node in a hidden layer is configured to perform a respective nonlinear or linear transformation on input data received at a respective node.

7. The method of claim 1, wherein the features extracted from the input signal comprise log filter bank features.

8. The method of claim 1, wherein the features extracted from the input signal comprise at least one of Mel-frequency cepstral coefficients (MFCCs) or perceptual linear prediction (PLP) features.

9. The method of claim 1, further comprising:
prior to extracting the features from the input signal, identifying whether the input signal is the wideband signal or the narrowband signal; and
when the input signal is identified as the narrowband signal, assigning values to missing features in the feature set.

10. The method of claim 1, wherein the DNN comprises:
an input layer that receives the feature set;
a plurality of hidden layers, each hidden layer comprising a respective plurality of nodes, each node in a hidden layer being configured to perform a nonlinear transformation on output of at least one node from an adjacent layer in the DNN; and
an output layer that comprises modeling units, the output layer receiving outputs of nodes from an uppermost hidden layer in the DNN, wherein output of the DNN comprises a probability distribution over the modeling units.

11. The method of claim 10, wherein the DNN is a context-dependent DNN, and wherein the units are senones.

12. A computing device comprising:
a processor; and
memory that comprises instructions that, when executed by the processor, cause the processor to perform acts comprising:
receiving an input audio signal, the input audio signal being one of a narrowband signal or a wideband signal;
extracting features from the input audio signal, the extracted features forming at least a portion of a feature vector;
providing the feature vector to a deep neural network (DNN), the DNN trained for speech recognition using heterogeneous training data corresponding to a plurality of users, the heterogeneous data comprising a wideband signal and a narrowband signal, the narrowband signal independent from the wideband signal, the DNN parameterized by a plurality of parameters and comprising multiple layers, the multiple layers comprising:
an input layer that receives the feature vector;
a plurality of hidden layers, each hidden layer comprising a respective plurality of nodes, each node in a hidden layer being configured to perform a nonlinear transformation on output of at least one node from an adjacent layer in the DNN; and
an output layer that comprises modeling units, the output layer receiving outputs of nodes from an uppermost hidden layer in the DNN, wherein output of the DNN comprises a probability distribution over the modeling units; and
recognizing at least one word in the input audio signal based upon values of the output layer of the DNN regardless of whether the input audio signal is the narrowband signal or the wideband signal; and
performing at least one computing operation responsive to recognizing the at least one word in the audio signal.

13. The computing device of claim 12, wherein a number of layers in the hidden layers is greater than three hidden layers.

14. The computing device of claim 12, wherein a number of nodes in each hidden layer of the plurality of hidden layers is at least one hundred nodes.

15. The computing device of claim 12, wherein the wideband signal is the input audio signal sampled at a first sampling rate, and wherein the narrowband signal is the input audio signal sampled at a second sampling rate that is less than the first sampling rate.

16. The computing device of claim 15, wherein the heterogeneous data used to train the DNN comprises wideband signals and narrowband signals.

17. The computing device of claim 16, wherein the first sampling rate is greater than 8 kHz and wherein the second sampling rate is less than or equal to 8 kHz.

18. The computing device of claim 17, wherein features in the feature vector are log filter bank features.

19. The computing device of claim 12 being a server that receives the input audio signal by way of a mobile computing device.

20. A computer-readable storage device medium comprising instructions that, when executed by a processor, cause the processor to perform acts comprising:
receiving an input signal, the input signal being one of a wideband signal or a narrowband signal, the wideband signal being a voice signal sampled at a first sampling rate, the narrowband signal being a voice signal sampled at a second sampling rate that is less than the first sampling rate;
extracting features from the input signal, wherein when the input signal is the wideband signal a feature vector is fully populated, and wherein when the input signal is the narrowband signal the feature vector comprises an unpopulated portion;
when the input signal is the narrowband signal, populating the unpopulated portion of the feature vector with values to cause the feature vector to be fully populated;
providing the feature vector as input to a deep neural network (DNN), the DNN comprising a plurality of parameters learned during a training phase based upon wideband signals and narrowband signals, the narrowband signals independent from the wideband signals;
retrieving values in an output layer of the DNN that correspond to the feature vector; and
recognizing at least one word in the input signal based upon the value in the output layer of the DNN, wherein the at least one word is recognized regardless of whether the input signal is the wideband signal or the narrowband signal.

* * * * *